(12) United States Patent
Ouderkirk et al.

(10) Patent No.: US 11,416,071 B1
(45) Date of Patent: *Aug. 16, 2022

(54) INFRARED TRANSPARENT BACKLIGHT DEVICE

(71) Applicant: Meta Platforms Technologies, LLC, Menlo Park, CA (US)

(72) Inventors: Andrew John Ouderkirk, Redmond, WA (US); Jacques Gollier, Sammamish, WA (US); Robin Sharma, Redmond, WA (US); Yusufu Njoni Bamaxam Sulai, Snohomish, WA (US); Brian Wheelwright, Sammamish, WA (US); Ying Geng, Bellevue, WA (US); Alexander Sohn, Seattle, WA (US); Abbas Mehdi Kazmi, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/220,373

(22) Filed: Apr. 1, 2021

Related U.S. Application Data

(63) Continuation of application No. 16/795,465, filed on Feb. 19, 2020, which is a continuation of application
(Continued)

(51) Int. Cl.
*G09G 5/00* (2006.01)
*G06F 3/01* (2006.01)
(Continued)

(52) U.S. Cl.
CPC ............... *G06F 3/013* (2013.01); *G06T 7/20* (2013.01); *H04N 5/2256* (2013.01); *H04N 5/33* (2013.01);
(Continued)

(58) Field of Classification Search
CPC ........ G09G 3/002; G09G 3/34; G09G 3/3406; G02F 1/137; G02F 1/13363;
(Continued)

(56) References Cited

U.S. PATENT DOCUMENTS 10,606,349 B1 * 3/2020 Ouderkirk .......... G02B 27/0093
10,996,752 B1 * 5/2021 Ouderkirk .......... G02B 27/0093
(Continued)

*Primary Examiner* — Jennifer T Nguyen
(74) *Attorney, Agent, or Firm* — Fenwick & West LLP

(57) ABSTRACT

A backlight device includes a first surface and a second surface that is opposite to the first surface. The backlight device is configured to emit light in a first optical band through the second surface toward a display panel of a head-mounted display (HMD). The display panel is configured to convert the light from the backlight device to image light. The backlight device is transparent to light in a second optical band that is different than the first optical band. An eye tracking system illuminates an eyebox with light in the second optical band. A camera assembly positioned adjacent to the first surface of the backlight device. The camera assembly is configured to capture images of the eye in the second optical band through the backlight device, the display panel. The eye tracking system determines eye tracking information based at least in part on the captured images.

20 Claims, 6 Drawing Sheets

Related U.S. Application Data

No. 16/015,605, filed on Jun. 22, 2018, now Pat. No. 10,606,349.

(51) Int. Cl.
*H04N 5/33* (2006.01)
*H04N 5/225* (2006.01)
*G06T 7/20* (2017.01)

(52) U.S. Cl.
CPC ............... *G06T 2207/10048* (2013.01); *G06T 2207/10152* (2013.01); *G06T 2207/30201* (2013.01)

(58) Field of Classification Search
CPC ............. G02F 1/13306; G02F 2203/07; G02B 27/0172; G02B 27/0087; G02B 27/286
USPC ........................................................... 345/8
See application file for complete search history.

(56) References Cited

U.S. PATENT DOCUMENTS

| | | | |
|---|---|---|---|
| 2004/0005451 A1* | 1/2004 | Kretman | G02B 5/0242 428/305.5 |
| 2007/0264447 A1* | 11/2007 | Oya | B32B 7/02 428/1.31 |
| 2008/0049446 A1* | 2/2008 | Harbers | G02B 6/0091 362/612 |
| 2017/0039960 A1* | 2/2017 | Jepsen | G02B 27/0172 |
| 2017/0169749 A1* | 6/2017 | Masuda | H01L 27/3227 |

\* cited by examiner

INFRARED TRANSPARENT BACKLIGHT DEVICE

CROSS REFERENCE TO RELATED APPLICATIONS

This application is a continuation of co-pending U.S. application Ser. No. 16/795,465, filed Feb. 19, 2020, which is a continuation of U.S. application Ser. No. 16/015,605, filed Jun. 22, 2018, now U.S. Pat. No. 10,606,349, each of which is incorporated by reference in its entirety.

BACKGROUND

The present disclosure generally relates to eye tracking in a head-mounted display (HMD), and specifically to using an infrared transparent backlight device for eye tracking applications in a HMD.

HMDs are becoming increasingly compact and have a higher field of view. As a result, there are increasing constraints on space available for eye tracking systems. Additionally, some applications expand the field of view requirements to also scan facial features, which further complicates the placement of tracking optics.

Conventional spatial light modulators are typically backlit, and the backlight may include an OLED emissive panel, a collimation system using one or more emissive elements with one or more refractive or reflective elements, or both, or a light guide system. Such backlight assemblies are opaque and scatter infrared (IR) light, and will not allow viewing a user's eye through the backside of the display module. For example, an IR camera positioned to image an object through a backlight assembly would have poor image quality due to the scattering of IR light caused by the backlight assembly.

SUMMARY

Embodiments relate to a backlight device that includes a first surface and a second surface that is opposite to the first surface. The backlight device is configured to emit light in a first optical band through the second surface toward a display panel of a head-mounted display (HMD). The display panel is configured to convert the light from the backlight device to image light. The backlight device is transparent to light in a second optical band that is different than the first optical band.

In some embodiments, the backlight device is part of a head-mounted display (HMD). In addition to the backlight device, the HMD includes an optics block, an eye tracking system, and a controller. The optics block includes one or more optical elements that direct the image light to an eyebox, the eyebox being a region in space that is occupied by an eye of a user of the HMD. The eye tracking system includes a light source that illuminates the eyebox with light in a second optical band that is different than the first optical band, a camera assembly positioned adjacent to the first surface of the backlight device, and the camera assembly captures images of the eye in the second optical band through the backlight device, the display panel, and the optics block. The controller determines eye tracking information based at least in part on the captured images.

Figure 1:
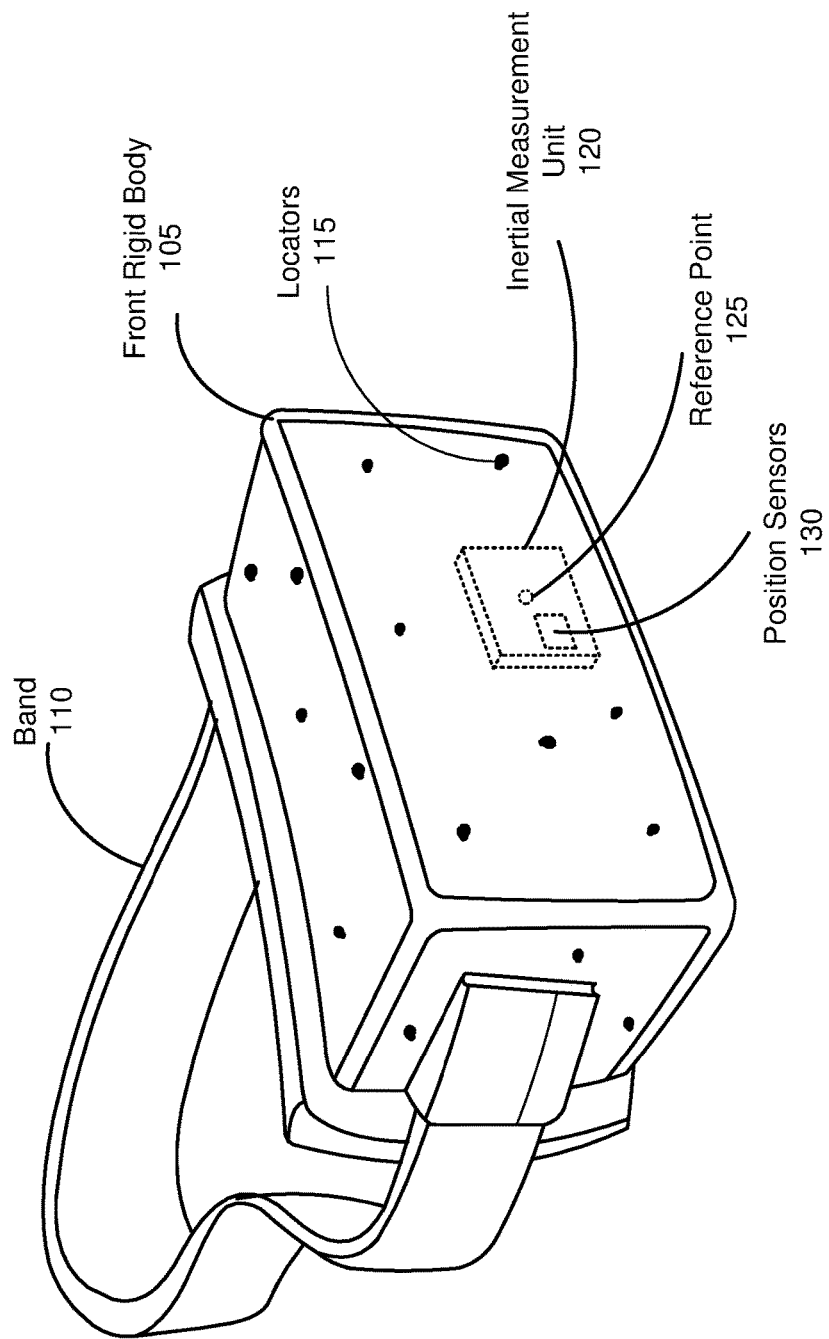
FIG. 1 is a diagram of a head-mounted display (HMD), in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A backlight device is implemented to improve image quality for eye tracking applications in a head-mounted display (HMD). The backlight device of the present disclosure is transparent and transmissive in a first optical band (e.g., infrared (IR) light), such that an eye tracking system may view a user's eye through the backlight device. The backlight is designed such that images taken by a camera (e.g., an IR camera) positioned to image an object through the backlight device have relatively high resolution (e.g., a spatial resolution of at least 1 line pair/mm) despite imaging the eye through, among other components, the backlight device.

The backlight device includes a first surface and a second surface that is opposite to the first surface. In some embodiments, the backlight device includes a plurality of light sources that are adjacent to the second surface and emit light in the first optical band, and a mirror assembly that is adjacent to the first surface. The mirror assembly acts to direct light from the plurality of light sources towards an eyebox in accordance with an associated angular and intensity distribution. In alternate embodiments, the backlight device includes a back reflector, a display light source, and a light guide. In some embodiments, the backlight device may also include a diffuser, and a gain film. The backlight device is configured to emit light in a first optical band through the second surface toward a display panel of a HMD. The display panel is configured to convert the light from the backlight device to image light. The backlight device is transparent to light in the second optical band.

In some embodiments, the backlight device is part of a HMD. The HMD includes, among other components, an electronic display, an optics block, and an eye tracking system. The electronic display is backlit and is transmissive in a first band of light and a second band of light. The eye tracking system includes a light source and a camera assembly. The light source illuminates the eye with IR light, and IR light reflected/scattered by the eye passes through the optics block and the electronic display to be captured by the camera assembly.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD connected to a host computer system, a standalone HMD, a mobile device or computing system, or any other hardware platform capable of providing artificial reality content to one or more viewers.

System Architecture

FIG. 1 is a diagram of a head-mounted display (HMD) 100, in accordance with one or more embodiments. Externally, the HMD 100 includes a front rigid body 105 and a band 110. Internally, the front rigid body 105 includes a plurality of locators 115, an inertial measurement unit (IMU) 120, a reference point 125, and position sensors 130.

The locators 115 are objects located in specific positions in the HMD 100 relative to one another and a specific reference point on the HMD 100. Each locator 115 may be a light emitting diode (LED), a corner cube reflector, a reflective marker, a type of light source that contrasts with the operating environment of the HMD 100, or some combination thereof. In embodiments where the locators 115 are active (i.e., an LED or other type of light emitting device), the locators 115 may emit light in the visible band (~380 nm to 750 nm), in the IR band (~750 nm to 1700 nm), in the ultraviolet band (200 nm to 380 nm), some other portion of the electromagnetic spectrum, or some combination thereof. In some embodiments, the locators 115 are located beneath an outer surface of the HMD 100, which is transparent to the wavelengths of light emitted or reflected by the locators 115 or is thin enough not to substantially attenuate the wavelengths of light emitted or reflected by the locators 115. Additionally, in some embodiments, the outer surface or other portions of the HMD 100 are opaque in the visible band of wavelengths of light. Thus, the locators 115 may emit light in the IR band under an outer surface that is transparent in the IR band but opaque in the visible band.

The IMU 120 is an electronic device that generates IMU data based on measurement signals received from the position sensors 130. A position sensor 130 generates one or more measurement signals in response to motion of the HMD 100. Examples of position sensors 130 include: one or more accelerometers, one or more gyroscopes, one or more magnetometers, another suitable type of sensor that detects motion, a type of sensor used for error correction of the IMU 120, or some combination thereof. The position sensors 130 may be located external to the IMU 120, internal to the IMU 120, or some combination thereof.

The reference point 125 is a point that may be used to describe the position of the HMD 100. While the reference point 125 may generally be defined as a point in space; however, in practice the reference point 125 is defined as a point within the HMD 100 (e.g., a center of the IMU 120).

Based on the one or more measurement signals from one or more position sensors 130, the IMU 120 generates IMU data indicating an estimated position of the HMD 100 relative to an initial position of the HMD 100. For example, the position sensors 130 include multiple accelerometers to measure translational motion (forward/back, up/down, left/right) and multiple gyroscopes to measure rotational motion (e.g., pitch, yaw, and roll). In some embodiments, the IMU 120 rapidly samples the measurement signals and calculates the estimated position of the HMD 100 from the sampled data. For example, the IMU 120 integrates the measurement signals received from the accelerometers over time to estimate a velocity vector and integrates the velocity vector over time to determine an estimated position of a reference point on the HMD 100.

In some embodiments, the HMD 100 may act as an artificial reality headset, or some combination thereof. In embodiments that describe, e.g., an AR or MR system environment, one or more portions of the HMD 100 may be at least partially transparent.

Figure 2:
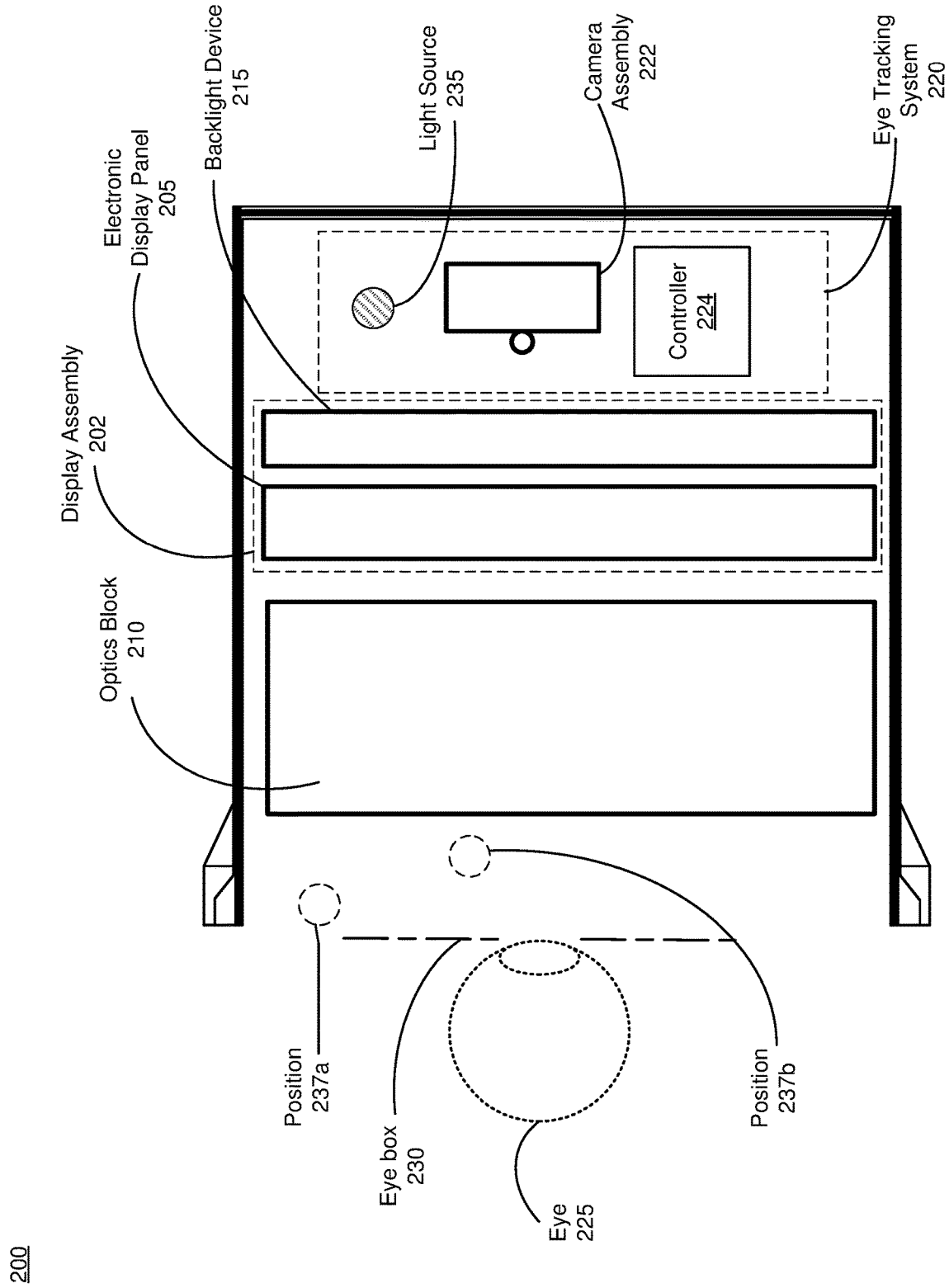
FIG. 2 is a cross-section of a front rigid body of the HMD in FIG. 1, in accordance with one or more embodiments.

FIG. 2 is a cross-section 200 of a front rigid body 105 of the HMD 100 in FIG. 1, in accordance with one or more embodiments. The cross-section 200 includes, among other components, a display assembly 202, an optics block 210, and an eye tracking system 220. Although FIG. 2 depicts a center cross-section of an eye 225, the center cross-section of the eye 225 and backlight device 215 do not have to be in the same place. An additional electronic display panel 205 and optics block 210, separate from those shown in FIG. 2, may be included in the front rigid body 105 to present content to another eye of the user. Additional optical elements (e.g., diffuser and gain film) may be included in the front rigid body 105, and an exemplary embodiment is described below with reference to FIG. 4.

The display assembly 202 generates image light and directs the image light toward the optics block 210. The display assembly includes a backlight device 215, an electronic display panel 205. Note FIG. 2 illustrates a specific configuration of the display assembly 202, and other configurations are possible. For example, another configuration of the display assembly is discussed below with reference to FIG. 4.

The backlight device 215 generates light that is provided to the electronic display panel 205. The backlight device 215 includes a plurality of light sources that generate light in a first optical band. The backlight device 215 is configured to redirect light within the first optical band (e.g., ambient light as well as light from the illumination source) toward the electronic display panel 205. The backlight device 215 is substantially transparent to light within a second optical band. In some embodiments, the first optical band represents wavelengths within the visible light range (e.g., 400 nm to 750 nm) and the second optical band represents wavelengths within the infrared range (e.g., 750 nm to 2500 nm). The reflective and transmissive capabilities of the backlight device 215 are due to the backlight device's 215 inclusion of a mirror assembly immersed within an optical material. The backlight device 215 including its associated plurality of lights sources and mirror assembly is described below with reference to FIG. 3 in detail.

The electronic display panel 205 spatially modulates light (received from the backlight device 215) in the first optical band to generate image light (e.g., content). In some embodiments, the electronic display panel 205 includes a color filter array overlaying a liquid crystal array. The color filter array may be, e.g., a Bayer pattern, or some other color pattern. Light in the first optical band from the backlight device 215 is modulated by the color filter array and the liquid crystal array to form the image light. The electronic display panel 205 emits the image light towards the optics block 210.

The optics block 210 magnifies received image light from the electronic display panel 205, corrects optical errors associated with the image light, and presents the corrected image light to a user of the HMD 100. The optics block 210 directs the magnified and/or corrected image light to an eyebox 230 for presentation to a user wearing the HMD 100. The eyebox 230 is a location in space that would be occupied by an eye 225 of a user of the HMD 100.

Magnification of the image light by the optics block 210 allows the electronic display panel 205 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 210 is designed so its effective focal length is larger than the spacing to the electronic display panel 205, which magnifies the image light projected by the electronic display panel 205.

In some embodiments, the optics block 210 is designed to correct one or more types of optical errors. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided by the electronic display panel 205 is pre-distorted such that it offsets some distortion caused by the optics block 210. In some embodiments, the optics block 210 includes a pancake lens block. The pancake lens block is described below with reference to FIG. 5 in detail.

The eye tracking system 220 tracks a position of the eye 225. The eye tracking system 220 includes one or more light sources, a camera assembly 222, and a controller 224. Although only one eye 225 of the user is shown in FIG. 2, in some embodiments, the eye tracking system 220 may include at least one light source and at least one camera assembly 222 for each eye 225 of the user. In some embodiments, separate eye tracking systems 220 may be implemented for each eye 225 of the user.

The one or more light sources are configured to emit light in a second optical band toward the eyebox 230. In some embodiments, the one or more light sources are implemented to illuminate the eye 225 such that glints off a cornea of the eye 225 may be captured by the camera assembly 222. In some embodiments, the one or more lights sources emit structured light. In alternative embodiments, one or more lights sources emit pulses of light that are used to determine depth via time of flight. A light source may be, e.g., light emitting diodes (LEDs), organic LEDs, microLEDs, some other light source that emits light in the second optical band, or some combination thereof. In the illustrated embodiments, the one or more lights sources include the light source 235.

FIG. 2 illustrates a light source 235, however, in some embodiments the light source 235 may include additional light sources. In the embodiment of FIG. 2, the light source 235 is adjacent to a first surface of the backlight device 215, and emits light through the backlight device 215 toward the eyebox 230. In some embodiments, the light source 235 is positioned elsewhere. For example, the light source 235 (or an additional light source) may be positioned at position 237a along a periphery of the optics block 210. At position 237a the light source 235 would generally be outside of a field of view of the eye 225. In some embodiments, the light source 235 is positioned at position 237b such that the light source is located in a field of view of the user. The light source 235 at positions 237a, 237b directly illuminates the eyebox 230. In some embodiments, a light source may be, e.g., a micoLED that is affixed to a surface of an optical element in the optics block 210. While there are two alternate positions 237a, 237b illustrated, the light source 235 (and other light sources of the one or more light sources) may be located elsewhere in the front rigid body. In some embodiments, the light source 235 is within a threshold distance from an optical axis of the HMD.

The camera assembly 222 captures images of the eye 220 through the backlight device 215, the electronic display panel 205, and the optics block 210 using one or more cameras. A camera may be, e.g., an array (1D or 2D) of photodiodes, a charge coupled display (CCD) array, some other device capable of detecting light in the second optical band, or some combination thereof. The camera assembly 222 captures images in accordance with instructions received from the controller 224. In some embodiments, an image captured by the camera assembly through the backlight device has a spatial resolution of at least 1 line pair/mm.

The controller 224 controls components of the eye tracking system 215. The controller 224 generates tracking instructions for the light source 235 and the camera assembly 222. In some embodiments, the controller 224 receives one or more images of the user's eye 220 captured by the camera assembly 222. The controller 224 determines eye tracking information using images from the camera assembly 222. For example, the controller 224 identifies locations of reflections of light from the light source 235 in an image of the eye 225. The controller 224 determines a position and an orientation of the eye 225 based on the shape and/or locations of the identified reflections. In cases where the target region is illuminated with a structured light pattern, the controller 224 can detect distortions of the structured light pattern projected onto the eye 225, and can estimate a position and an orientation of the eye 225 based on the detected distortions. The controller 224 can also estimate a pupillary axis, a gaze angle (e.g., corresponds to a foveal axis), a translation of the eye, a torsion of the eye, and a current shape of the eye 225 based on one or more images captured by the camera assembly 222.

In some embodiments, the front rigid body further includes a varifocal module (not shown in FIG. 2). The varifocal module may adjust focus of one or more images displayed on the electronic display panel 205, based on the eye tracking information. In one embodiment, the varifocal module adjusts focus of the displayed images and mitigates vergence-accommodation conflict by adjusting a focal distance of the optics block 210 based on the determined eye tracking information. In another embodiment, the varifocal module adjusts focus of the displayed images by performing foveated rendering of the one or more images based on the determined eye tracking information. In yet another embodiment, the varifocal module utilizes the depth information from the controller 224 to generate content for presentation on the electronic display panel 205.

Figure 3:
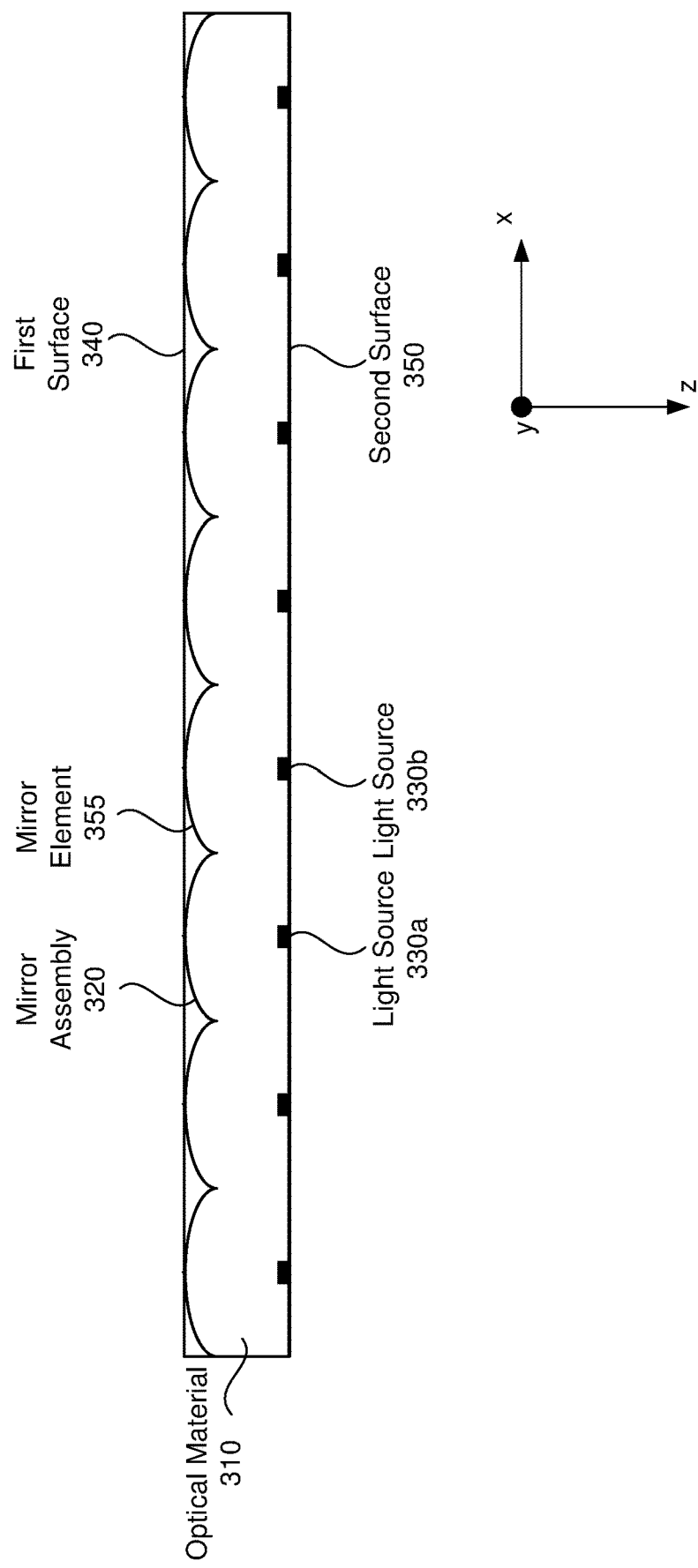
FIG. 3 is a diagram of a backlight device that scatters one range of wavelengths and transmits another, in accordance with one or more embodiments.

FIG. 3 is a cross section of a portion of the backlight device 215 of FIG. 2 that is reflective to light in a first optical band and is transparent to light a second optical band, in accordance with one or more embodiments. The cross section is in the x-z plane. The backlight device 215 includes a first surface 340 and a second surface 350 that is opposite to the first surface 340, as described above with reference to FIG. 2. The backlight device 215 further includes a plurality of light sources 330a, 330b that are adjacent to the second surface 350 and emit light in the first optical band, and a mirror assembly 320 that is adjacent to the first surface 340. The mirror assembly 320 acts to direct light from the plurality of light sources towards the eyebox 230 in accordance with an associated angular and intensity distribution. The mirror assembly 320 includes a plurality of mirror elements. Each mirror element is configured to reflect light from at least one corresponding light source toward the eye box 230. For example, a mirror element 355 is configured to reflect light from the light source 330b toward the eyebox 230 in accordance with a specific angular and intensity distribution. The mirror assembly 320 is transparent to light in the second optical band, and is reflective to light in the first optical band. In some embodiments, the second optical band is a band of light in the infrared and the first optical band is a band of light in the visible.

The mirror assembly 320 is immersed within an optical material 310 of the backlight device 215. The light sources 330a, 330b direct light toward the mirror assembly 320 through a portion of the optical material 310. The light is partially collimated by the mirror assembly 320 and directed back to the light sources 330a, 330b. The mirror assembly 320 is highly reflective for visible wavelengths (e.g., 400 nm to 750 nm), and is transparent for infrared wavelengths (e.g., 750 nm to 2500 nm). The mirror assembly 320 is made of materials used for reflectors (e.g., thin metal film, dielectric coatings, coextruded polymeric reflectors). The mirror assembly 320 has a shape that provides a desired angular and intensity distribution. For example, if the light sources 230a, 230b have a length and height that are substantially equal (e.g., square emitting area), then the shape of mirror assembly 320 is preferably a compound curve. For example, the portion of the cross section of the backlight device 215 in FIG. 3 is in an x-z plane. In some embodiments, a cross section of the backlight device 215 in the y-z plane looks substantially the same such that there is a two-dimensional grid of light sources and corresponding mirror elements. If the light sources 230a, 230b have a high aspect ratio, then the shape of the mirror assembly 320 is preferably anamorphic or cylindrically shaped. For example, if each light source is a line source the mirror elements may be cylindrically shaped (e.g., the cross section of the does not change along the y dimension). Other suitable shapes may be generated using tools known by those skilled in the art of optical design.

Figure 4:
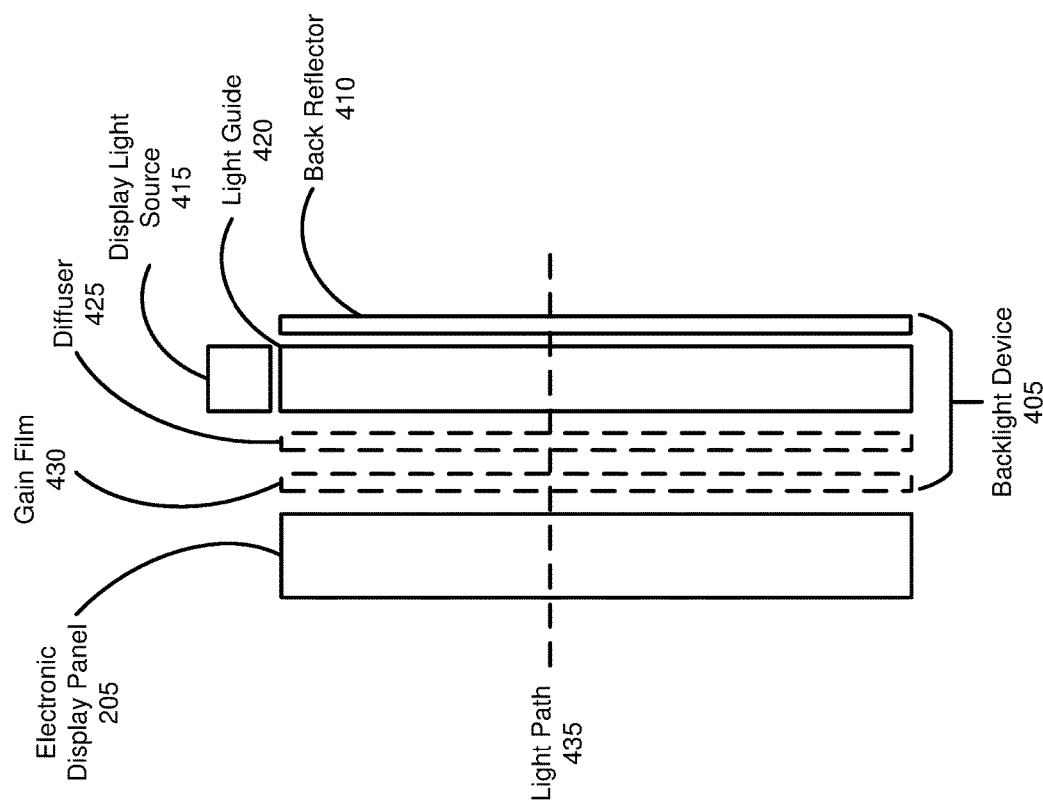
FIG. 4 is an example display assembly, in accordance with one or more embodiments.

FIG. 4 is an example display assembly 400, in accordance with one or more embodiments. The display assembly 400 includes a backlight device 405 and an electronic display panel 205. The backlight device 405 generates light that is provided to the electronic display panel 205. The backlight device 405 includes a back reflector 410, a display light source 415, and a light guide 420. In some embodiments, the backlight device may also include a diffuser 425, and a gain film 430.

The back reflector 410 is transparent to infrared light over at least a portion of its area and is reflective to visible light. The display light source 415 generates visible light that is provided to the light guide 420. The display light source 415 is external to the backlight device 215. In the embodiment of FIG. 4, the display light source 415 is adjacent to the light guide 420. The light guide 420 has extraction features (not shown in FIG. 4) on one or both sides of the light guide 420. The extraction features scatter visible light and have high scatter for infrared light as well. Low scatter for infrared light may be accomplished by reducing the extraction feature density near the light path 435, which in turn achieves acceptable image clarity. The density of the extraction features may be modified over the remaining area of the light guide to achieve sufficient illumination uniformity. In some embodiments, the extraction features of the light guide 420 are in the same position as light sources 330a, 330b of the backlight device 215 of FIG. 3.

The diffuser 425 may have electronically controllable diffusivity, where the diffuser 425 scatters light for at least a period, and then is controlled to reduce scatter, in which time a camera assembly forms an image of an eye. The diffuser 425 may be positioned between the light guide 420 and the electronic display panel 205. Suitable diffusers include polymer dispersed liquid crystals (PDLC), electrically switchable liquid crystal diffraction gratings, and electrically switchable liquid crystal lenticular structures.

The gain film 430 may be angular gain film or films, a reflective polarizer, or both. If the gain film 430 is an angular gain film, the area adjacent to the light path is flat and has no gain in order to increase the clarity and transmission of infrared light from the infrared light source 235. If the gain film 430 is a reflective polarizer, the reflective polarizer is transparent for both polarizations for the range of wavelengths emitted by an infrared light source. In some embodiments, the diffuser 425 and gain film 430 are positioned between the light guide 420 and the electronic display panel 205. An area of the electronic display panel 205 adjacent to the light path 435 has good clarity for infrared light.

A camera assembly (not shown in FIG. 4) sensitive to light in a second band (e.g., IR light) emitted by a light source may be positioned behind the back reflector 410 and configured to image an eye. An area of the back reflector 410 adjacent to the light path 435 may have lower reflectivity for visible light to improve infrared light transparency. Similarly, an area of the diffuser 425 adjacent to the light path 435 may be less diffuse, or transparent with little to no diffusivity.

Figure 5:
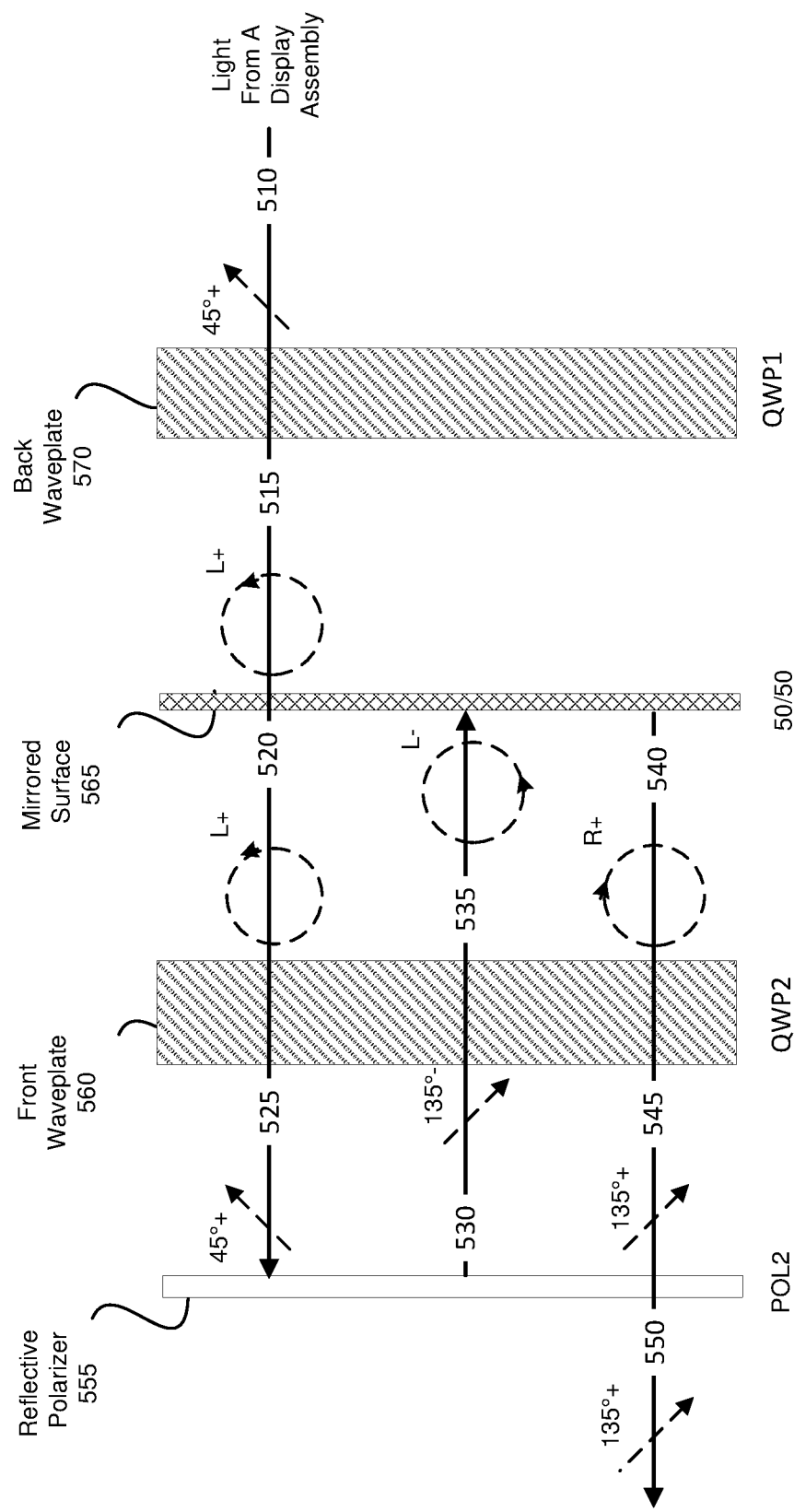
FIG. 5 shows a folded optical path with example polarization states of a pancake lens block, in accordance with one or more embodiments.

FIG. 5 shows a folded optical path of a pancake lens block, in accordance with one or more embodiments. The pancake lens block includes a reflective polarizer 555, a front waveplate 560, a mirrored surface 565, and a back waveplate 570. In some embodiments, the optics block 210 of FIG. 2 includes a pancake lens block. In some embodiments, light from display assembly (e.g., the display assembly 202) is initially polarized via initial polarizer (POL1) (not shown in FIG. 5) to linearly polarized light 510. In alternate embodiments, the light 510 emitted by the display assembly is already linearly polarized. Back waveplate 570 (QWP1) is a quarter-waveplate with an axis 45 degrees relative to the direction of polarization of light 510. The orientation of the waveplate axis relative to the incident linearly polarized light controls the handedness and polarization ellipticity of the emitted circularly polarized light. QWP1 changes the polarization of light 510 from linear polarization to circular polarization for the designed wavelength at the designed angle—shown as light 515. The polarization of light 515 may be clockwise or anti-clockwise based on the orientation of the axis of QWP1 relative to incident linearly polarized light.

A first portion of light 515 is reflected by mirrored surface 565, and a second portion of light 520 is transmitted by mirrored surface 565 towards front waveplate 140 (QWP2). In some embodiments, mirrored surface 565 is configured to reflect 50% of incident light (e.g., the light 515). Similarly, QWP2 is a quarter-waveplate and changes the polarization of light 520 from circular to linear (referred to as light 525). Light 525 is incident on reflective polarizer 555 (POL2), which reflects light that is polarized in a blocking direction (e.g., x direction) and transmits light that is polarized in a perpendicular direction (e.g., y-direction). At this point, light 525 is linearly polarized in the blocking direction. Thus, POL2 reflects light 525 and the reflected light is referred to as light 530. Accordingly, light 530 is again incident on QWP2 which changes the linear polarized light 530 to circularly polarized light 535 and mirrored surface 565 reflects a portion of the polarized light 535, as described above. The reflected portion of light 535 is referred to as light 540.

Light 540 is also circularly polarized; however, its handedness is opposite that of light 535 and 520 due to the reflection from mirrored surface 565. Thus, QWP2 changes the polarization of circularly polarized light 540 to linearly polarized light 545. However, as the handedness of the light 540 is opposite to that of light 520, the polarization of light 545 is perpendicular to that of light 525. Accordingly, light 545 is linearly polarized in a direction (e.g., y) perpendicular to the blocking direction (e.g., x) and is therefore transmitted by QWP2 as light 550.

Each of the back waveplate 570, the mirrored surface 565, the front waveplate 560, and the reflective polarizer 555 are coupled to respective surfaces of optical elements. In some embodiments, each of the respective surfaces are on different optical elements. In other embodiments, some of the surfaces may be shared by a single optical element. For example, the back waveplate 570 may be located on a first surface of a first optical element, and the mirrored surface 565 may be located on a second surface of the first optical element, and the second surface is opposite the first surface. And the front waveplate 560 may be located on a first surface of a second optical element, and the reflective polarizer 555 may be located on a second surface of the second optical element, and the second surface is opposite the first surface. In some embodiments, one or more of the surfaces may be curved to provide optical power. Additionally, displacement of one or more of the optical elements may change the location of the image plane.

Figure 6:
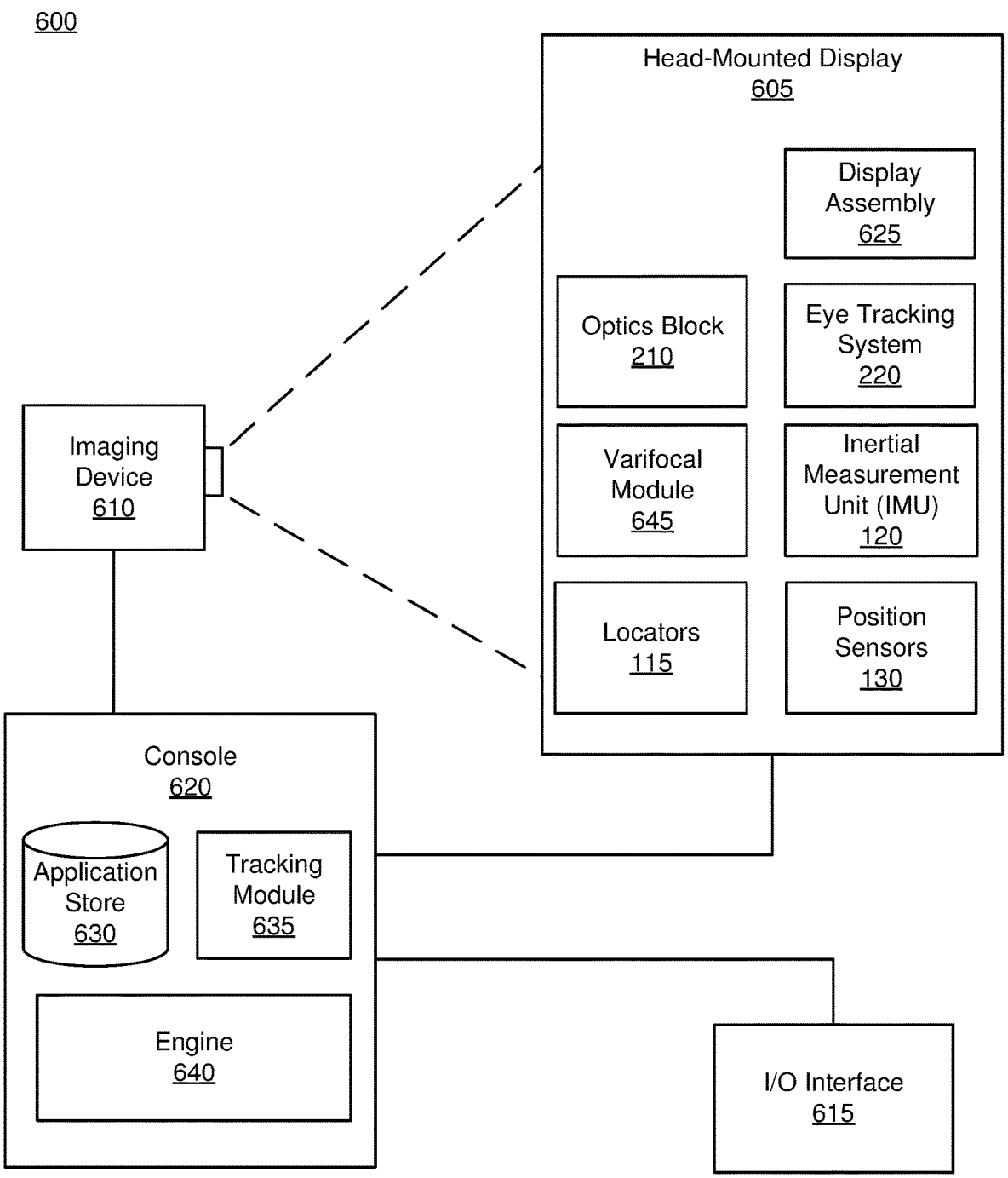
FIG. 6 is a block diagram of an HMD system, in accordance with one or more embodiments.

FIG. 6 is a HMD system 600 in accordance with one or more embodiments. The system 600 may be used as an artificial reality system. The system 600 includes an HMD 605, an imaging device 610, and an input/output (I/O) interface 615, which are each coupled to a console 620. While FIG. 5 shows a single HMD 605, a single imaging device 610, and a single I/O interface 615, in other embodiments, any number of these components may be included in the HMD system 600. For example, there may be multiple HMDs 600, each having an associated I/O interface 615 and being monitored by one or more imaging devices 610, with each HMD 605, I/O interface 615, and imaging devices 610 communicating with the console 620. In other embodiments, different and/or additional components may also be included in the system 600.

The HMD 605 may act as an artificial reality HMD. In some embodiments, the HMD 605 augments views of a physical, real-world environment with computer-generated elements (e.g., images, video, sound, etc.). The HMD 605 presents content to a user. In some embodiments, the HMD 100 is an embodiment of the HMD 605. Example content includes images, video, audio, or some combination thereof. Audio content may be presented via a separate device (e.g., speakers and/or headphones) external to the HMD 605 that receives audio information from the HMD 605, the console 620, or both. The HMD 605 includes one or more locators 115, the inertial measurement unit (IMU) 120, the position sensors 130, a display assembly 625 the optics block 210, and a varifocal module 645.

The locators 115 are objects located in specific positions on the HMD 605 relative to one another and relative to a specific reference point on the HMD 605. A locator 115 may be a light emitting diode (LED), a corner cube reflector, a reflective marker, a type of light source that contrasts with an environment in which the HMD 605 operates, or some combination thereof. Active locators 115 (i.e., an LED or other type of light emitting device) may emit light in the visible band (~380 nm to 750 nm), in the infrared (IR) band (~440 nm to 1700 nm), in the ultraviolet band (10 nm to 380 nm), some other portion of the electromagnetic spectrum, or some combination thereof.

The locators 115 can be located beneath an outer surface of the HMD 605, which is transparent to the wavelengths of light emitted or reflected by the locators 115 or is thin enough not to substantially attenuate the wavelengths of light emitted or reflected by the locators 115. Further, the outer surface or other portions of the HMD 605 can be opaque in the visible band of wavelengths of light. Thus, the locators 615 may emit light in the IR band while under an outer surface of the HMD 605 that is transparent in the IR band but opaque in the visible band.

As described above with reference to FIG. 1, the IMU 120 is an electronic device that generates IMU data based on measurement signals received from one or more of the position sensors 130, which generate one or more measurement signals in response to motion of HMD 605. Examples of the position sensors 130 include accelerometers, gyroscopes, magnetometers, other sensors suitable for detecting motion, correcting error associated with the IMU 120, or some combination thereof.

Based on the measurement signals from the position sensors 130, the IMU 120 generates IMU data indicating an estimated position of the HMD 605 relative to an initial position of the HMD 605. For example, the position sensors 130 include multiple accelerometers to measure translational motion (forward/back, up/down, left/right) and multiple gyroscopes to measure rotational motion (e.g., pitch, yaw, and roll). The IMU 120 can, for example, rapidly sample the measurement signals and calculate the estimated position of the HMD 605 from the sampled data. For example, the IMU 120 integrates measurement signals received from the accelerometers over time to estimate a velocity vector and integrates the velocity vector over time to determine an estimated position of a reference point on the HMD 605. The reference point is a point that may be used to describe the position of the HMD 605. While the reference point may generally be defined as a point in space, in various embodiments, a reference point is defined as a point within the HMD 605 (e.g., a center of the IMU 120). Alternatively, the IMU 120 provides the sampled measurement signals to the console 620, which determines the IMU data.

The IMU 120 can additionally receive one or more calibration parameters from the console 620. As further discussed below, the one or more calibration parameters are used to maintain tracking of the HMD 605. Based on a received calibration parameter, the IMU 120 may adjust one or more of the IMU parameters (e.g., sample rate). In some embodiments, certain calibration parameters cause the IMU 120 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The display assembly 625 displays images to the user in accordance with data received from the console 620. In various embodiments, the display assembly 625 comprises a one or more backlight devices (e.g., the backlight device 215, 405) and one or more corresponding electronic display panels (e.g., the electronic display panels 205). In some embodiments, there is a backlight device and corresponding electronic display panel for each eye.

The backlight device is configured to generate light in a first optical band from a plurality of light sources, and the backlight device includes a mirror assembly, immersed in optical material, that is substantially reflective in the first optical band and is substantially transparent in a second optical band that is different than the first optical band. The mirror assembly is configured to reflect light in first optical band through the second surface toward an electronic display panel which converts the light from the backlight device to image light. The electronic display panel manipulates and directs emitted light from the backlight reflector to display media generated by the HMD 605. In particular, the electronic display panel spatially modulates white imaging light using a color filter array and a liquid crystal array. Alternatively, the backlight device includes a back reflector, a light guide, a display light source, an optional diffuser, and an optional gain film, as described above with reference to FIG. 4 in detail.

The optics block 210 magnifies image light received from the display assembly 625, corrects optical errors associated with the image light, and presents the corrected image light to a user of the HMD 605. The optics block 210 includes a plurality of optical elements. Example optical elements included in the optics block 210 include: an aperture, a Fresnel lens, a convex lens, a concave lens, a filter, a reflecting surface, a feature waveguide, or any other suitable optical element that affects image light. Moreover, the optics block 210 may include combinations of different optical elements. In some embodiments, one or more of the optical elements in the optics block 210 may have one or more coatings, such as partially reflective or anti-reflective coatings.

The eye tracking system 220 determines eye tracking information associated with an eye of a user wearing the HMD 605. The eye tracking information determined by the eye tracking system 220 may comprise information about an orientation of the user's eye, i.e., information about an angle of an eye-gaze. The eye tracking system 220 is discussed above in detail with regard to FIG. 2.

In some embodiments, the varifocal module 645 is further integrated into the HMD 505. The varifocal module 645 may be coupled to the eye tracking system 220 to obtain eye tracking information determined by the eye tracking system 220. The varifocal module 545 may be configured to adjust focus of one or more images displayed on the electronic display panel 205, based on the determined eye tracking information obtained from the eye tracking system 220. In this way, the varifocal module 645 can mitigate vergence-accommodation conflict in relation to image light. The varifocal module 645 can be interfaced (e.g., either mechanically or electrically) with at least one of the electronic display panel 205 and at least one optical element of the optics block 210. Then, the varifocal module 645 may be configured to adjust focus of the one or more images displayed on the electronic display panel 205 by adjusting position of at least one of the electronic display panel 205 and the at least one optical element of the optics block 210, based on the determined eye tracking information obtained from the eye tracking system 220. By adjusting the position, the varifocal module 645 varies focus of image light output from the electronic display panel 205 towards the user's eye. The varifocal module 645 may be also configured to adjust resolution of the images displayed on the electronic display panel 205 by performing foveated rendering of the displayed images, based at least in part on the determined eye tracking information obtained from the eye tracking system 220. In this case, the varifocal module 645 provides appropriate image signals to the electronic display panel 205. The varifocal module 645 provides image signals with a maximum pixel density for the electronic display panel 205 only in a foveal region of the user's eye-gaze, while providing image signals with lower pixel densities in other regions of the electronic display panel 205.

The I/O interface 615 is a device that allows a user to send action requests to the console 620. An action request is a request to perform a particular action. For example, an action request may be to start or end an application or to perform a particular action within the application. The I/O interface 615 may include one or more input devices. Example input devices include a keyboard, a mouse, a game controller, or any other suitable device for receiving action requests and communicating the received action requests to the console 620. An action request received by the I/O interface 615 is communicated to the console 620, which performs an action corresponding to the action request. In some embodiments, the I/O interface 615 may provide haptic feedback to the user in accordance with instructions received from the console 620. For example, haptic feedback is provided by the I/O interface 615 when an action request is received, or the console 620 communicates instructions to the I/O interface 615 causing the I/O interface 615 to generate haptic feedback when the console 620 performs an action.

The console 620 provides content to the HMD 605 for presentation to the user in accordance with information received from the imaging device 610, the HMD 505, or the I/O interface 615. In the example shown in FIG. 5, the console 620 includes an application store 630, a tracking module 635, and an engine 640. Some embodiments of the console 620 have different or additional modules than those described in conjunction with FIG. 6. Similarly, the functions further described below may be distributed among components of the console 620 in a different manner than is described here.

The application store 630 stores one or more applications for execution by the console 620. An application is a group of instructions, that when executed by a processor, generates content for presentation to the user. Content generated by an application may be in response to inputs received from the user via movement of the HMD 605 or the I/O interface 615. Examples of applications include gaming applications, conferencing applications, video playback application, or other suitable applications.

The tracking module 635 calibrates the system 600 using one or more calibration parameters and may adjust one or more calibration parameters to reduce error in determining position of the HMD 605. For example, the tracking module 635 adjusts the focus of the imaging device 610 to obtain a more accurate position for observed locators 115 on the HMD 605. Moreover, calibration performed by the tracking module 635 also accounts for information received from the IMU 120. Additionally, if tracking of the HMD 605 is lost (e.g., imaging device 610 loses line of sight of at least a threshold number of locators 115), the tracking module 635 re-calibrates some or all of the system 600 components.

Additionally, the tracking module 635 tracks the movement of the HMD 605 using imaging information from the imaging device 610 and determines positions of a reference point on the HMD 605 using observed locators from the imaging information and a model of the HMD 605. The tracking module 635 also determines positions of the reference point on the HMD 605 using position information from the IMU information from the IMU 120 on the HMD 605. Additionally, the tracking module 635 may use portions of the IMU information, the imaging information, or some combination thereof, to predict a future location of the HMD 605, which is provided to the engine 640.

The engine 640 executes applications within the system 600 and receives position information, acceleration information, velocity information, predicted future positions, or some combination thereof for the HMD 605 from the tracking module 635. Based on the received information, the engine 640 determines content to provide to the HMD 605 for presentation to the user, such as a virtual scene, one or more virtual objects to overlay onto a real world scene, etc. Additionally, the engine 640 performs an action within an application executing on the console 620 in response to an action request received from the I/O interface 615 and provides feedback to the user that the action was performed. The provided feedback may be visual or audible feedback via the HMD 605 or haptic feedback via I/O interface 615.

In some embodiments, based on the eye tracking information (e.g., orientation of the user's eye) received from the eye tracking system 625, the engine 640 determines resolution of the content provided to the HMD 605 for presentation to the user on the display assembly 625. The engine 640 provides the content to the HMD 605 having a maximum pixel resolution on the display assembly 625 in a foveal region of the user's gaze, whereas the engine 640 provides a lower pixel resolution in other regions of the display assembly 625, thus achieving less power consumption at the HMD 605 and saving computing cycles of the console 620 without compromising a visual experience of the user. In some embodiments, the engine 640 can further use the eye tracking information to adjust where objects are displayed on the display assembly 625 to prevent vergence-accommodation conflict.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A backlight device comprising:
a light guide configured to:
in-couple light in a first optical band emitted from a first light source adjacent to the light guide,
scatter the in-coupled light, and
propagate the scattered light in the first optical band in a first direction towards a first surface of the light guide and a display area outside of the backlight device; and
a back reflector adjacent to a second surface of the light guide, the back reflector configured to:
reflect a portion of the scattered light in the first optical band in the first direction towards the second surface of the light guide, and
propagate light in a second optical band in a second direction opposite to the first direction after being reflected from at least one surface of an eye, the light in the second optical band originating from a second light source positioned behind the back reflector.

2. The backlight device of claim 1, wherein the light guide comprises a plurality of extraction features configured to scatter the in-coupled light.

3. The backlight device of claim 2, wherein the extraction features are coupled to at least one of the first surface and the second surface.

4. The backlight device of claim 2, wherein a density of the extraction features is non-uniform over at least one of the first surface and the second surface.

5. The backlight device of claim 1, further comprising a diffuser adjacent to the first surface of the light guide, the diffuser configured to scatter the propagated light in the first optical band for a defined time period according to scattering instructions.

6. The backlight device of claim 5, wherein the diffuser is selected from a group consisting of: polymer dispersed liquid crystals, electrically switchable liquid crystal diffraction gratings, and electrically switchable liquid crystal lenticular structures.

7. The backlight device of claim 5, further comprising a gain film positioned between the diffuser and the display area.

8. The backlight device of claim 7, wherein the gain film comprises at least one of an angular gain film and a reflective polarizer.

9. The backlight device of claim 7, wherein the gain film is transparent to polarized light in the second optical band.

10. The backlight device of claim 1, wherein the first optical band is a band of light in the visible and the second optical band is a band of light in the infrared.

11. The backlight device of claim 1, wherein the back reflector is transparent to the light in the second optical band over at least a portion of an area of the back reflector.

12. The backlight device of claim 1, wherein the back reflector is reflective to the light in the first optical band.

13. The backlight device of claim 1, further comprising:
a camera assembly configured to capture images of the eye by capturing the light in the second optical band reflected from the at least one surface of the eye and passing through the backlight device prior to being captured by the camera assembly; and
a controller configured to determine a gaze direction for the eye based at least in part on the captured images.

14. A display assembly comprising:
a display element; and
a backlight device configured to propagate light in a first optical band towards the display element, the backlight device including:
a light guide configured to:
in-couple the light in the first optical band emitted from a first light source adjacent to the light guide,
scatter the in-coupled light, and
propagate the scattered light in the first optical band in a first direction towards a first surface of the light guide and the display element, and
a back reflector adjacent to a second surface of the light guide, the back reflector configured to:
reflect a portion of the scattered light in the first optical band in the first direction towards the second surface of the light guide, and
propagate light in a second optical band in a second direction opposite to the first direction after being reflected from at least one surface of an eye, the light in the second optical band originating from a second light source positioned behind the back reflector.

15. The display assembly of claim 14, wherein the display element is configured to generate image light by spatially modulating the light in the first optical band received from the backlight device.

16. The display assembly of claim 14, further comprising:
a camera assembly configured to capture images of the eye by capturing the light in the second optical band reflected from the at least one surface of the eye and passing through the backlight device prior to being captured by the camera assembly; and
a controller configured to determine a gaze direction for the eye based at least in part on the captured images.

17. The display assembly of claim 16, further comprising:
a varifocal module configured to adjust focus of the light in the first optical band before reaching the display element, based on the determined gaze direction.

18. The display assembly of claim 14, wherein the light guide comprises a plurality of extraction features configured to scatter the in-coupled light, the extraction features coupled to at least one of the first surface and the second surface.

19. The display assembly of claim 14, wherein the backlight device further comprises:
a diffuser adjacent to the first surface of the light guide; and
a gain film positioned between the diffuser and the display element.

20. A head-mounted display (HMD) comprising:
a display element;
a backlight device configured to propagate light in a first optical band towards the display element, the display element generates image light by spatially modulating the light in the first optical band received from the backlight device, the backlight device including:
a light guide configured to:
in-couple the light in the first optical band emitted from a first light source adjacent to the light guide,
scatter the in-coupled light, and
propagate the scattered light in the first optical band in a first direction towards a first surface of the light guide and the display element, and
a back reflector adjacent to a second surface of the light guide, the back reflector configured to:
reflect a portion of the scattered light in the first optical band in the first direction towards the second surface of the light guide, and
propagate light in a second optical band in a second direction opposite to the first direction after being reflected from at least one surface of an eye of a user of the HMD, the light in the second optical band originating from a second light source positioned behind the back reflector; and
one or more optical elements configured to direct the image light to an eyebox, the eyebox being a region in space that is occupied by the eye.

* * * * *

UNITED STATES PATENT AND TRADEMARK OFFICE
CERTIFICATE OF CORRECTION

PATENT NO. : 11,416,071 B1
APPLICATION NO. : 17/220373
DATED : August 16, 2022
INVENTOR(S) : Andrew John Ouderkirk It is certified that error appears in the above-identified patent and that said Letters Patent is hereby corrected as shown below:

On the Title Page

In Column 1, item (63), under Continuation, Line 2, delete "2020," and insert -- 2020, now Pat. No. 10,996,752, --, therefor.

Signed and Sealed this
Twenty-ninth Day of November, 2022

Katherine Kelly Vidal
*Director of the United States Patent and Trademark Office*